US006992140B2

(12) United States Patent
Kosono et al.

(10) Patent No.: US 6,992,140 B2
(45) Date of Patent: Jan. 31, 2006

(54) CURABLE UNSATURATED RESIN COMPOSITION

(75) Inventors: Makoto Kosono, Osaka (JP); Katsuhiro Doi, Osaka (JP); Koji Kirisawa, Osaka (JP); Youko Kawasaki, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 107 days.

(21) Appl. No.: 10/477,523

(22) PCT Filed: May 17, 2002

(86) PCT No.: PCT/JP02/04789

§ 371 (c)(1),
(2), (4) Date: Nov. 20, 2003

(87) PCT Pub. No.: WO02/094897

PCT Pub. Date: Nov. 28, 2002

(65) Prior Publication Data

US 2004/0158006 A1 Aug. 12, 2004

(30) Foreign Application Priority Data

May 22, 2001 (JP) ...................................... 2001-152321

(51) Int. Cl.

| | |
|---|---|
| ***C08L 67/06*** | (2006.01) |
| ***C08L 45/00*** | (2006.01) |
| ***C08F 283/01*** | (2006.01) |

(52) U.S. Cl. ........................ 525/164; 525/216; 525/227; 525/297; 525/312; 525/39; 525/48

(58) Field of Classification Search ................. 525/164, 525/216, 227, 297, 312, 39, 48
See application file for complete search history.

(56) References Cited

U.S. PATENT DOCUMENTS 4,829,123 A 5/1989 Shigematsu et al. .......... 525/28
5,047,455 A * 9/1991 Hesse et al. ................ 523/508

FOREIGN PATENT DOCUMENTS

JP 57-66903 4/1982
JP 57-165417 10/1982

* cited by examiner

*Primary Examiner*—James J. Seidleck
*Assistant Examiner*—Olga Asinovsky
(74) *Attorney, Agent, or Firm*—Armstrong, Kratz, Quintos, Hanson & Brooks, LLP

(57) ABSTRACT

The present invention provides a curable unsaturated resin composition, which has less odor characteristics and high safety and is also superior in thin film coating characteristics in a coating film. The curable unsaturated resin composition contains a polymerizable unsaturated resin (A) having two or more polymerizable unsaturated double bonds in a molecule, a hydroxyalkyl (meth)acrylate (B), and an unsaturated compound (C) having one or more cyclohexene rings and two or more allyl ether groups in a molecule, which is liquid at normal temperature.

9 Claims, No Drawings

CURABLE UNSATURATED RESIN COMPOSITION

TECHNICAL FIELD

The present invention relates to a curable unsaturated resin composition, which has less odor characteristics and is also superior in safety and drying characteristics in a thin film portion of a coating film.

BACKGROUND ART

Unsaturated polyester resins have hitherto been used as coating compositions for woodworking, molded articles, sealing materials and adhesives because they have good gloss and desirable thick appearance, and also impart beautiful finishing appearance. Also the unsaturated polyester resin is used in combination with a styrene monomer, as a crosslinkable unsaturated monomer, in view of the curability and physical properties. However, in view of environmental problems, a social trend of regulating the use of the styrene monomer, that can cause problems such volatility, odor, and toxicity, has recently increased. When using the styrene monomer as coating materials such as coating compositions, there arise problems in that grain depression of a coating film is caused by volatilization of the styrene monomer during curing of the coating film, resulting in variability in quality.

To cope with these problems, (1) a method of reducing the content of a styrene monomer by decreasing the molecular weight of an unsaturated polyester resin, (2) a method of suppressing volatilization of a styrene monomer by adding wax to a unsaturated polyester resin composition containing a crosslinkable unsaturated monomer, and (3) a method of using a crosslinkable unsaturated monomer having low volatility in place of a styrene monomer are proposed. However, the methods (1) and (2) do not constitute a radical solution to the above problems because of the use of the styrene monomer, while those having satisfactory curability and drying characteristics, especially thin film drying characteristics in the coating film, have not been obtained by the method (3).

DISCLOSURE OF INVENTION

An object of the present invention is to provide a curable unsaturated resin composition, which has less odor characteristics and high safety and is also superior in thin film drying characteristics in a coating film.

The present inventors have intensively researched about this object, and thus the present invention has been completed.

The present invention provides a curable unsaturated resin composition comprising a polymerizable unsaturated resin (A) having two or more polymerizable unsaturated double bonds in a molecule, a hydroxyalkyl (meth)acrylate (B), and an unsaturated compound (C) having one or more cyclohexene rings and two or more allyl ether groups in a molecule, which is liquid at normal temperature.

BEST MODE FOR CARRYING OUT THE INVENTION

The present invention will now be described in detail.

Examples of the polymerizable unsaturated resin (A) having two or more polymerizable unsaturated double bonds in a molecule of the present invention include unsaturated polyester resin, epoxy (meth)acrylate, urethane (meth) acrylate, and polyester (meth)acrylate, and the number-average molecular weight is more than 1000, and preferably within a range from 1000 to 5000. These polymerizable unsaturated resins may be used alone and, if necessary, two or more kinds thereof may be used in combination. Among these polymerizable unsaturated resins, an unsaturated polyester resin is particularly preferred in view of the curability, drying characteristics, and coating film physical properties.

The unsaturated polyester resin used in the present invention is obtained from dibasic acids containing α,β-unsaturated dibasic acid and polyhydric alcohols. Among these unsaturated polyester resins, an air-drying characteristics-imparting unsaturated polyester resin is particularly preferred in view of the drying characteristics in the coating film.

Examples of the air-drying characteristics-imparting unsaturated polyester resin include those using a compound containing a cyclic aliphatic unsaturated polybasic acid and a derivative thereof as a dibasic acid component, those using a hydroxy compound having an allyl ether group as a polyhydric alcohol component, those using a dicyclopentadiene-based compound, and those using linseed oil and tung oil as a drying oil. Among these air-drying characteristics-imparting unsaturated polyester resins, those using a compound containing a cyclic aliphatic unsaturated polybasic acid and a derivative thereof as a dibasic acid component are particularly preferred in view of the drying characteristics in the coating film.

Examples of the cyclic aliphatic unsaturated polybasic acid and the derivative thereof include tetrahydrophthalic anhydride, methyltetrahydrophthalic anhydride, endomethylenetetrahydrophthalic anhydride, α-terpinene maleic anhydride adduct, and trans-piperylene maleic anhydride adduct. Among these compounds, methyltetrahydrophthalic anhydride is particularly preferred.

As the hydroxy compound having an allyl ether group, publicly known and conventional compounds can be used, and typical examples thereof include allyl ether compounds of polyhydric alcohols, such as ethylene glycol monoallyl ether, diethylene glycol monoallyl ether, triethylene glycol monoallyl ether, polyethylene glycol monoallyl ether, propylene glycol monoallyl ether, dipropylene glycol monoallyl ether, tripropylene glycol monoallyl ether, polypropylene glycol monoallyl ether, 1,2-butylene glycol monoallyl ether, 1,3-butylene glycol monoallyl ether, hexylene glycol monoallyl ether, octylene glycol monoallyl ether, trimethylolpropane diallyl ether, glycerin diallyl ether, and pentaerythritol triallyl ether.

Examples of the α,β-unsaturated dibasic acid as the dibasic acid component used to prepare the unsaturated polyester resin include maleic acid, maleic anhydride, fumaric acid, itaconic acid, and itaconic anhydride. Examples of the saturated dibasic acid as the dibasic acid component include phthalic acid, phthalic anhydride, halogenated phthalic anhydride, isophthalic acid, terephthalic acid, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecanoic diacid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and dialkyl esters thereof. Examples of polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, neopentyl glycol, hydrogenated bisphenol A, 1,4-butanediol, adduct of bisphenol A and propylene oxide or ethylene oxide, 1,2,3,4-tetrahydroxybutane, glycerin, trimethylolpropane, 1,3-propanediol, 1,2-cyclohexane glycol, 1,3-cyclohexane glycol, 1,4-cyclohexane glycol, 1,4-cyclohexanedimethanol, paraxylene glycol, bicyclohexyl-4,4'-diol, 2,6-decalin glycol, and 2,7-decalin glycol.

The epoxy (meth)acrylate preferably has two or more (meth)acryloyl groups in a molecule, and is obtained by reacting an epoxy resin and a (meth)acrylic acid in the presence of an esterification catalyst.

Examples of the epoxy resin include bisphenol type and novolak type epoxy resins, and a mixture of bisphenol type and novolak type epoxy resins, and the average epoxy equivalent thereof is preferably within a range from 150 to 450.

The bisphenol type epoxy resin is a glycidyl ether type epoxy resin having substantially two or more epoxy groups in a molecule obtained by reacting epichlorohydrin and bisphenol A or bisphenol F, a methyl glycidyl ether type epoxy resin obtained by reacting methyl epichlorohydrin and bisphenol A or bisphenol F, or an epoxy resin obtained from an alkylene oxide adduct of bisphenol A and epichlorohydrin or methyl epichlorohydrin. Typical examples of the novolak type epoxy resin include epoxy resin obtained by reacting phenol novolak or cresol novolak with epichlorohydrin or methyl epichlorohydrin.

In the preparation of the epoxy (meth)acrylate, acrylic acid and methacrylic acid are used, but another unsaturated monobasic acid, for example, cinnamic acid, crotonic acid, maleic acid monomethyl, monopropyl maleate, mono(2-ethylhexyl)maleate, or sorbic acid can be used in combination. The reaction between the epoxy resin and the (meth) acrylic acid is preferably conducted at a temperature within a range from 60 to 140° C., and particularly preferably from 80 to 120° C., using an esterification catalyst.

As the esterification catalyst, for example, a tertiary amine such as triethylamine, N,N-dimethylbenzylamine, N,N-dimethylaniline, or diazabicyclooctane, or a publicly known catalyst such as triphenylphosphine or diethylamine hydrochloride can be used as it is.

The urethane (meth)acrylate is preferably obtained by reacting polyol, polyisocyanate and a (meth)acrylate having one or more hydroxyl groups in a molecule, and has two or more (meth)acryloyl groups in a molecule.

The polyol preferably has a number-average molecular weight of 200 to 3000, and particularly preferably 400 to 2000. Typical examples of the polyol include polyether polyol, polyester polyol, polycarbonate polyol, and polybutadiene polyol.

The polyether polyol can also include polyol obtained by adding the alkylene oxide to bisphenol A and bisphenol F, in addition to a polyalkylene oxide such as polyethylene glycol, polypropylene glycol, or polytetramethylene glycol.

The polyester polyol is a condensed polymer of saturated dibasic acids and polyhydric alcohols, or a ring-opening polymer of a cyclic ester compound such as polycaprolactone. Examples of dibasic acids used herein include phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecanedicarboxylic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and dialkyl esters thereof.

Examples of polyhydric alcohols include ethylene glycol, diethylene glycol, triethylene glycol, polyethylene glycol, propylene glycol, dipropylene glycol, tripropylene glycol, polypropylene glycol, 2-methyl-1,3-propanediol, 1,3-butanediol, neopentyl glycol, hydrogenated bisphenol A, 1,4-butanediol, 1,6-hexanediol, adduct of bisphenol A and propylene oxide or ethylene oxide, 1,2,3,4-tetrahydroxybutane, glycerin, trimethylolpropane, 1,3-propanediol, 1,2-cyclohexane glycol, 1,3-cyclohexane glycol, 1,4-cyclohexane glycol, 1,4-cyclohexanedimethanol, paraxylene glycol, bicyclohexyl-4,4'-diol, 2,6-decalin glycol, and 2,7-decalin glycol.

Examples of the polyisocyanate include 2,4-tolylene diisocyanate and isomers thereof or a mixture of isomers (herein abbreviated to TDI), diphenylmethane diisocyanate, hexamethylene diisocyanate, isophorone diisocyanate, xylylene diisocyanate, hydrogenated xylylene diisocyanate, dicyclohexylmethane diisocyanate, tolidine diisocyanate, naphthalene diisocyanate, and triphenylmethane triisocyanate. These polyisocyanates can be used alone, or two or more kinds of them can be used in combination. Among these polyisocyanates, diisocyanate, particularly TDI, is preferably used.

Examples of the (meth)acrylate having one or more hydroxyl groups in a molecule used in urethane (meth) acrylate include mono(meth)acrylates such as 2-hydroxyethyl (meth)acrylate, 2-hydroxypropyl (meth) acrylate, 3-hydroxybutyl (meth)acrylate, polyethylene glycol mono(meth)acrylate, and polypropylene glycol mono (meth)acrylate; and polyhydric (meth)acrylates such as tris (hydroxyethyl)isocyanuric acid di(meth)acrylate, and pentaerythritol tri(meth)acrylate.

Examples of the method for preparing the urethane (meth) acrylate include (i) a method of preferably reacting polyisocyanate with polyol at a ratio of NCO/OH (=1.3 to 2) to form a terminal isocyanate compound and reacting the terminal isocyanate compound with a hydroxyl group-containing (meth)acrylate compound so that the amount of isocyanate groups is almost the same as that of hydroxyl groups and (ii) a method of reacting a polyisocyanate compound with a hydroxyl group-containing (meth)acrylate compound at a ratio of NCO/OH (=2 or more) to form an isocyanate terminated compound and reacting the compound with a polyol.

The polyester (meth)acrylate is a saturated or unsaturated polyester resin having two or more (meth)acryloyl groups in a molecule, and is obtained by reacting a terminal of a saturated or unsaturated polyester with a (meth)acrylic compound. The number-average molecular weight of such a resin is preferably within a range from 500 to 5000.

The saturated polyester is obtained by the condensation reaction between saturated dibasic acids and polyhydric alcohols, while the unsaturated polyester is obtained by the condensation reaction between dibasic acids containing $\alpha,\beta$-unsaturated dibasic acid and polyhydric alcohols, and has functional groups for introducing the (meth)acrylic compound into the terminal.

Examples of saturated dibasic acids include saturated dibasic acids described above, and unsaturated dibasic acids described above can be used. Polyhydric alcohols can be used in polyester polyols described above.

Examples of the (met)acrylic compound used in the polyester (meth)acrylate include glycidyl esters of acrylic acid or methacrylic acid. Preferably, glycidyl (meth)acrylate is used.

As the hydroxyalkyl (meth)acrylate (B) used in the present invention, hydroxyalkyl (meth)acrylate, which has an alkyl group having 1 to 4 carbon atoms, is preferred and hydroxyethyl methacrylate is particularly preferred in view of the odor, safety, viscosity and curability. As long as the effects of the present invention are not impaired, a monomer having (meth)acryloyl groups can be used in combination. As the monomer, there can be used lauryl (meth)acrylate, cyclohexyl (meth)acrylate, benzyl (meth)acrylate, stearyl (meth)acrylate, tridecyl (meth)acrylate, dicyclopentenyloxyethyl (meth)acrylate, ethylene glycol monomethyl ether (meth)acrylate, ethylene glycol monoethyl ether (meth) acrylate, ethylene glycol monobutyl ether (meth)acrylate, ethylene glycol monohexyl ether (meth)acrylate, ethylene glycol mono-2-ethylhexyl ether (meth)acrylate, diethylene glycol monomethyl ether (meth)acrylate, diethylene glycol monoethyl ether (meth)acrylate, diethylene glycol monobutyl ether (meth)acrylate, diethylene glycol monohexyl ether (meth)acrylate, diethylene glycol mono-2-ethylhexyl ether (meth)acrylate, ethylene glycol di(meth)acrylate, diethylene glycol di(meth)acrylate, triethylene glycol di(meth)acrylate, dipropylene glycol di(meth)acrylate, tripropylene glycol (meth)acrylate, phenoxyethyl (meth)acrylate, di(meth) acrylate of polytetramethylene glycol, 1,3-butylene glycol di(meth)acrylate, 1,6-hexanediol di(meth)acrylate, neopentyl glycol di(meth)acrylate, 2-hydroxy-1,3-dimethacryloxypropane, 2,2-bis[4-(methacryloxyethoxy) phenyl]propane, 2,2-bis[4-(methacryloxydiethoxy)phenyl] propane, 2,2-bis[4-(methacryloxypolyethoxy)phenyl] propane, tetraethylene glycoldiacrylate, ethylene oxide-modified (n=2) diacrylate of bisphenol A, ethylene oxide isocyanurate-modified (n=3) diacrylate, and pentaerythritol diacrylate monostearate in combination. In the case in which the wear resistance, scratch resistance, agitation resistance and chemical resistance of the resin and the surface of the cured article must be improved, a polyfunctional unsaturated monomer, and preferably tri- or polyfunctional (meth) acrylate ester monomer are used in combination. Specifically, polymerizable monomers such as trimethylolpropane tri(meth)acrylate, tetramethylolmethane triacrylate, tetramethylolmethane tetraacrylate, pentaerythritoltriacrylate, trimethylolpropanepropylene oxide-modified (n=1) triacrylate, ethylene oxide isocyanurate-modified (n=3) triacrylate, ethylene oxide isocyanurate (n=3) ε-caprolactone-modified triacrylate, dipentaerythritol pentacrylate and dipentaerythritol hexaacrylate, and pentaerythritol tetra(meth)acrylate can be used in combination.

The unsaturated compound (C) having one or more cyclohexene rings and two or more allyl ether groups in a molecule, which is liquid at normal temperature, used in the present invention is preferably an unsaturated ester compound derived from an acid component (C1) made of a carboxylic acid having a cyclohexene ring and a hydroxy compound (C2) having two or more allyl ether groups in a molecule. It is obtained by the esterification reaction at the reaction ratio so that the number of hydroxyl groups is from 0.5 to 1.3 per carboxyl group. In order that the unsaturated compound (C) of the present invention be liquid at normal temperature, the number-average molecular weight is preferably 1000 or less, and more preferably 700 or less. The viscosity of the unsaturated compound (C) of the present invention is preferably within a range from 10 to 100 dPa·s/(25° C., B type viscometer), and more preferably from 15 to 50 dPa·s/(25° C., B type viscometer).

The carboxylic acid (C1) having a cyclohexene ring is cyclohexenedicarboxylic acid, which may have an alkyl substituent and, for example, an anhydride of 4-cyclohexene-1,2-dicarboxylic acid (tetrahydrophthalic anhydride) and an anhydride 3-methyl-4-cyclohexene-1,2-dicarboxylic acid (methyltetrahydrophthalic anhydride) are particularly preferred. The saturated dibasic acid may be used in combination, in addition to the carboxylic acid having a cyclohexene ring.

The hydroxy compound (C2) having two or more allyl ether groups in a molecule is a polyallyl ether of a polyhydric alcohol and, for example, hydroxy compounds having a hydroxyl group and 2 to 4 allyl ether groups, such as trimethylolpropane diallyl ether, glycerin diallyl ether and pentaerythritol triallyl ether are particularly preferred. In addition to the hydroxy compounds, polyhydric alcohols may be used in combination.

The mixing ratio of the polymerizable unsaturated resin (A), the hydroxyalkyl methacrylate (B) and the unsaturated compound (C), (A):(B):(C), is preferably within a range from 25–85% by weight:10–55% by weight:5–20% by weight, and more preferably from 40–70% by weight:20–40% by weight:10–20% by weight. When the mixing ratio is such a weight ratio, the resulting curable unsaturated resin composition has a proper viscosity and a good handlability, and is also superior in curability and drying characteristics.

The curable unsaturated resin composition of the present invention can be cured at normal temperature or by heating. To the composition, polymerization initiators are usually added and, if necessary, polymerization accelerators are added.

Examples of the polymerization initiator include organic peroxide. Specifically, publicly known polymerization initiators such as diacyl peroxide, peroxy ester, hydroperoxide, dialkyl peroxide, ketone peroxide, peroxy ketal, alkyl perester and percarbonate compounds can be used. The amount of the polymerization initiators is preferably within a range from 0.1 to 6 parts by weight based on 100 parts by weight of the total amount of the curable unsaturated resin composition.

Examples of the polymerization accelerator include metal soaps such as cobalt naphthenate, cobalt octylate, zinc octylate, vanadium octylate, copper naphthenate, and barium naphthenate; metal cheletes such as vanadium acetylacetate, cobalt acetylacetate, and iron acetylacetonate; N,N-substituted anilines such as, N,N-dimethylaniline, N,N-diethylaniline, p-toluidine, N,N-dimethyl-p-toluidine, N,N-bis(2-hydroxyethyl)-p-toluidine, 4-(N,N-dimethylamino) benzaldehyde, 4-[N,N-bis(2-hydroxyethyl)amino] benzaldehyde, 4-(N-methyl-N-hydroxyethylamino) benzaldehyde, N,N-bis(2-hydroxypropyl)-p-toluidine, N-ethyl-m-toluidine, triethanolamine, m-toluidine, diethylenetriamine, pyridine, phenylmorpholine, piperidine, and N,N-bis(hydroxyethyl)aniline; N,N-substituted-p-toluidines such as diethanolamine; and amines such as 4-(N,N-substituted amino)benzaldehyde. In the present invention, amine-based and metal soap-based accelerators are preferred. The amount of the polymerization accelerator is preferably within a range from 0.1 to 5 parts by weight based on the 100 parts by weight of the total amount of the curable unsaturated resin composition. Two or more kinds of these polymerization accelerators may be used. Furthermore, these polymerization accelerators may be previously added to the unsaturated resin composition, or may be added before use.

To maintain the storage stability, polymerization inhibitors can also be added to the curable unsaturated resin composition of the present invention.

Examples of the polymerization inhibitor include trihydrobenzene, toluhydroquinone, 14-naphthoquinone, parabenzoquinone, hydroquinone, benzoquinone, hydroquinone monomethyl ether, p-tert-butyl catechol and 2,6-di-tert-butyl-4-methylphenol. Preferably, 10 to 1000 ppm of the polymerization inhibitor can be added to the unsaturated resin composition.

The curable unsaturated resin composition of the present invention can also be cured by active energy rays. In that case, photopolymerization initiators are added to the composition. The photopolymerization initiator is not specifically limited as long as it generates radicals by an action of light, and examples thereof include 4-phenoxydichloroacetophenone, 4-t-butyl-dichloroacetophenone, diethoxyacetophenone, 2-hydroxy-2-methyl-1-phenylpropan-1-one, 1-(4-isopropylenephenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexyl phenyl ketone, 2-methyl1-[4-(methylthio)phenyl]-2-molpholinopropane-1, benzoin, benzoinmethyl ether, benzoinethyl ether, benzoinisopropyl ether, benzoin isobutyl ether, benzyl dimethyl ketal, benzophenone, benzoylbenzoic acid, methyl benzoyl benzoate, 4-phenylbenzophenone, hydroxybenzophenone, 4-benzoyl-4'-methyldiphenyl sulfide, 3,3'-dimethyl-4-methoxybenzophenone, thioxanthone, 2-chlorothioxanthone, 2-methylthioxanthone, 2,4-dimethylthioxanthone, isopropylthioxanthone, camphorquinone, dibenzosuberone, 2-ethylanthraquinone, 4',4'-diethylisophthalophenone, 3,3',4,4'-tetra(t-butylperoxycarbonyl)benzophenone, α-acyloxime ester, acyl phosphine oxide, methylphenyl glyoxylate, benzyl, 9,10-phenanthrenequinone, and 4-(2-hydroxyethoxy)phenyl (2-hydroxy-2-propyl)ketone. Examples of the auxiliary thereof include triethanolamine, triisopropanolamine, 4,4'-dimethylaminobenzophenone (Michler's ketone), 4,4'-diethylaminobenzophenone, 2-dimethylaminoethylbenzoic acid, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, and 2,4-diisopropylthioxanthone. Among these compounds, benzyl dimethyl ketal, 1-hydroxycyclohexyl phenyl ketone, benzoyl isopropyl ether, 4-(2-hydroxyethoxy)-phenyl(2-hydroxy-2-propyl)ketone, 2-hydroxy-2-methyl-1-phenylpropan-1-one are preferably used.

In the curable unsaturated resin composition of the present invention, various additives such as fillers, ultraviolet absorbers, pigments, low-shrinking agents, antioxindats, plasticizers, aggregates, flame retardants, stabilizers, reinforcers may be used.

Examples of the filler include calcium carbonate, magnesium carbonate, barium sulfate, mica, talc, kaolin, clay, celite, asbestos, perlite, baryta, silica, silica sand, dolomite, limestone, plaster, fine aluminum powders, hollow balloons, alumina, glass powder, aluminum hydroxide, white marble, zirconium oxide, antimony trioxide, titanium oxide, molybdenum dioxide, and zinc stearate. These fillers are selected taking account of the handlability and the strength, appearance and economy of the resulting molded articles. Usually, calcium carbonate, aluminum hydroxide, silica and talc are often used. Fillers include surface-treated fillers.

Examples of the pigment include inorganic pigments such as titanium white and carbon black and organic pigments such as phthalocyanine blue and quinacridone red. According to the color hue, various colorants can be used.

Examples of the reinforcer include glass fibers; organic fibers made of vinylon, polyester and phenol; asbestos; and carbon fibers.

Examples of other additives include viscosity modifiers such as viscosity reducing agent, thixotropic agents, thixotropic auxiliaries, defoamers, leveling agents, silane coupling agents, and air blocking agents such as paraffin, and commercially available products can be used.

Solvents as the viscosity modifier are sometimes added to the curable unsaturated resin composition of the present invention. Examples of the solvent include toluene, xylene, methanol, ethanol, propanol, butanol, ethyl acetate, butyl acetate, acetone, and methyl ethyl ketone.

The curable unsaturated resin composition of the present invention is useful as coating materials, FRP molded articles, resin concretes, patties, and cast products. It is particularly useful as coating materials and coating compositions for woodworking.

EXAMPLES

The present invention will be described in more detail by way of Examples, but the present invention is not limited to the following Examples. In the specification, parts are by weight unless otherwise specified.

Reference Example 1

Preparation of Air-drying Characteristics-imparting Unsaturated Polyester Resin (A)

In a 2 L glass flask equipped with a nitrogen gas introducing tube, a reflux condenser and a stirrer, 502 g (4.74 mol) of diethylene glycol, 320 g (2.75 mol) of fumaric acid and 305 g (1.83 mol) of methyltetrahydrophthalic anhydride are charged and heating is started under a nitrogen gas flow. The dehydration condensation reaction is conducted at an internal temperature of 200° C. using a conventional method. After the acid value reached 29 KOH mg/g, 0.33 g of toluhydroquinone is added. After cooling to 150° C., an air-drying characteristics-imparting unsaturated polyester resin (UP-1), which is solid at normal temperature, was obtained.

Reference Example 2

Preparation of Air-drying Characteristics-imparting Unsaturated Polyester Resin (A)

In a 2 L glass flask equipped with a nitrogen gas introducing tube, a reflux condenser and a stirrer, 509 g (4.80 mol) of diethylene glycol, 103 g (0.48 mol) of trimethylolpropane diallyl ether and 557 g (4.80 mol) of fumaric acid are charged and heating is started under a nitrogen gas flow. The dehydration condensation reaction is conducted at an internal temperature of 190° C. using a conventional method. After the acid value reached 29 KOH mg/g, 0.33 g of toluhydroquinone is added. After cooling to 150° C., an air-drying characteristics-imparting unsaturated polyester resin (UP-2), which is solid at normal temperature, was obtained.

Reference Example 3

Preparation of Unsaturated Ester Compound (C)

In a 2 L glass flask equipped with a nitrogen gas introducing tube, a reflux condenser and a stirrer, 973 g (3.80 mol) of pentaerythritol triallyl ether and 614 g (3.70 mol) of methyltetrahydrophthalic anhydride are charged and heating is started under a nitrogen gas flow. The esterification reaction is conducted at an internal temperature of 160° C.

for 4 hours using a conventional method to obtain an unsaturated ester compound (AD-1), which is liquid (viscosity: 20 dPa·s) at normal temperature.

Reference Example 4

Preparation of Unsaturated Ester Compound (C)

In a 2 L glass flask equipped with a nitrogen gas introducing tube, a reflux condenser and a stirrer, 883 g (4.13 mol) of trimethylolpropane diallyl ether and 597 g (3.93 mol) of tetrahydrophthalic anhydride are charged and heating is started under a nitrogen gas flow. The esterification reaction is conducted at an internal temperature of 160° C. for 4 hours using a conventional method to obtain an unsaturated ester compound (AD-2), which is liquid (viscosity: 18 dPa·s) at normal temperature.

Preparation of Resin Composition

Example 1

To a solution prepared by dissolving 60 parts of air-drying characteristics-imparting unsaturated polyester resin (UP-1) obtained in Reference Example 1 in 40 parts of hydroxyethyl methacrylate, 20 parts of the unsaturated ester compound (AD-1) obtained in Reference Example 3 was added.

Example 2

To a solution prepared by dissolving 60 parts of air-drying characteristics-imparting unsaturated polyester resin (UP-1) obtained in Reference Example 1 in 40 parts of hydroxyethyl methacrylate, 20 parts of the unsaturated ester compound (AD-2) obtained in Reference Example 4 was added.

Example 3

To a solution prepared by dissolving 60 parts of air-drying characteristics-imparting unsaturated polyester resin (UP-2) obtained in Reference Example 2 in 40 parts of hydroxyethyl methacrylate, 20 parts of the unsaturated ester compound (AD-1) obtained in Reference Example 3 was added.

Example 4

To a solution prepared by dissolving 60 parts of air-drying characteristics-imparting unsaturated polyester resin (UP-2) obtained in Reference Example 2 in 40 parts of hydroxyethyl methacrylate, 20 parts of the unsaturated ester compound (AD-2) obtained in Reference Example 4 was added.

Comparative Example 1

60 Parts of air-drying characteristics-imparting unsaturated polyester resin (UP-1) obtained in Reference Example 1 was dissolved in 40 parts of a styrene monomer.

Comparative Example 2

60 Parts of air-drying characteristics-imparting unsaturated polyester resin (UP-1) obtained in Reference Example 1 was dissolved in 40 parts of methyl methacrylate.

Comparative Example 3

60 Parts of air-drying characteristics-imparting unsaturated polyester resin (UP-2) obtained in Reference Example 2 was dissolved in 40 parts of hexanediol dimethacrylate.

Comparative Example 4

60 Parts of air-drying characteristics-imparting unsaturated polyester resin (UP-1) obtained in Reference Example 1 was dissolved in 40 parts of hydroxyethyl methacrylate.

Test Procedure and Evaluation

Evaluation of "Less Odor Characteristics"

The resulting curable unsaturated resin composition is charged in an open vessel and the odor, which is detectable to a tester at the position that is 5 cm away from his nose, is rated as follows.

Criteria for Rating Less Odor Characteristics

○: no odor at the position that is 5 cm away from the nose

Δ: subtle odor at the position that is 5 cm away from the nose

X: strong odor at the position that is 5 cm away from the nose

Evaluation of "Drying Characteristics in Coating Film"

To 100 parts of the resulting curable unsaturated resin composition, 0.5 parts of 6% cobalt naphthenate (Co-NAPHTHENATE 6%, manufactured by DAINIPPON INK & CHEMICALS Co., Ltd.) and 1.5 parts of methylethylketone peroxide (Permeck N, manufactured by NOF CORPORATION) are added in a glass beaker, followed by stirring. The resulting mixture is applied on a glass sheet at 25° in each of a thickness of (i) 254 μm and (ii) 76 μm using an applicator to obtain test samples. At that time, the time required for the adhesion of the surface of the coating film (i) to disappear is referred to as a "thick film drying time", while the time required for the adhesion of the surface of the coating film (ii) to disappear is referred to as a "thin film drying time". The time required for the curable unsaturated resin composition in the beaker to cure (based on JIS-K-6901.4.8) is referred to as the "curing time".

TABLE 1

Evaluation of less odor characteristics

| | | Examples | | | | Comparative Examples | | |
|---|---|---|---|---|---|---|---|---|
| | | 1 | 2 | 3 | 4 | 1 | 2 | 3 |
| Resin composition | UP-1 | 60 | 60 | — | — | 60 | 60 | — |
| | UP-2 | — | — | 60 | 60 | — | — | 60 |
| | β-HEMA | 40 | 40 | 40 | 40 | — | — | — |
| | SM | — | — | — | — | 40 | — | — |
| | MMA | — | — | — | — | — | 40 | — |
| | HDDMA | — | — | — | — | — | — | 40 |
| | AD-1 | 20 | — | 20 | — | — | — | — |
| | AD-2 | — | 20 | — | 20 | — | — | — |
| Less odor characteristics | | ○ | ○ | ○ | ○ | X | X | Δ |

TABLE 2

Evaluation of drying characteristics in coating film

| | | Examples | | | | Comparative Examples | | |
|---|---|---|---|---|---|---|---|---|
| | | 1 | 2 | 3 | 4 | 2 | 3 | 4 |
| Resin composition | UP-1 | 60 | 60 | — | — | 60 | — | 60 |
| | UP-2 | — | — | 60 | 60 | — | 60 | — |
| | β-HEMA | 40 | 40 | 40 | 40 | — | — | 40 |
| | MMA | — | — | — | — | 40 | — | — |
| | HDDMA | — | — | — | — | — | 40 | — |
| | AD-1 | 20 | — | 20 | — | — | — | — |
| | AD-2 | — | 20 | — | 20 | — | — | — |
| Curability (min.) | | 20 | 20 | 20 | 20 | 40 | 60 | 20 |
| Thick film drying characteristics (hours) | | 1.5 | 2 | 2 | 2.5 | 5 | 6 | 1.5 |
| Thin film drying characteristics (hours) | | 1.8 | 2.5 | 2.3 | 3.0 | 10< | 10< | 8 |

In the tables described above, β-HEMA is hydroxyethyl methacrylate, SM is styrene, MMA is methyl methacrylate, and HDDMA is hexanediol dimethacrylate.

Hydroxyethyl methacrylate used in the present invention has high boiling point and high flash point as compared with styrene, as shown below, and has high safety.

TABLE 3

| | Boiling point (° C.) | Flash point (° C.) |
|---|---|---|
| Styrene | 145 | 31 |
| Hydroxyethyl methacrylate | 205 | 107 |

Industrial Applicability

The curable unsaturated resin composition of the present invention can provide excellent coating materials and coating compositions for woodworking because it has less odor characteristics and high safety and is also superior in thin film drying characteristics in a coating film.

What is claimed is:

1. A curable unsaturated resin composition comprising a polymerizable unsaturated resin (A) having two or more polymerizable unsaturated double bonds in a molecule, a hydroxyalkyl (meth)acrylate (B), and an unsaturated compound (C) having one or more cyclohexene rings and two or more allyl ether groups in a molecule, which is liquid at normal temperature.

2. The curable unsaturated resin composition according to claim 1, wherein the hydroxyalkyl (meth)acrylate (B) has an alkyl group having 1 to 4 carbon atoms.

3. The curable unsaturated resin composition according to claim 1, wherein the unsaturated compound (C) is an unsaturated ester compound having a number-average molecular weight of 1000 or less derived from a carboxylic acid having a cyclohexene ring and a hydroxy compound having two or more allyl ether groups in a molecule.

4. The curable unsaturated resin composition according to claim 1, wherein the unsaturated compound (C) is derived from carboxylic acid having a cyclohexene ring and a hydroxy compound having two or more allyl ether groups in a molecule, and has a viscosity of 10 to 100 dPa·s.

5. The curable unsaturated resin composition according to claim 3, wherein the carboxylic acid is cyclohexenedicarboxylic acid, which may have an alkyl substituent, and the hydroxy compound is a polyallyl ether of a polyhydric alcohol.

6. The curable unsaturated resin composition according to claim 4, wherein the carboxylic acid is cyclohexenedicarboxylic acid, which may have an alkyl substituent, and the hydroxy compound is a polyallyl ether of a polyhydric alcohol.

7. The curable unsaturated resin composition according to claim 1, which contains 25 to 85% by weight of the polymerizable unsaturated resin (A), 10 to 55% by weight of the hydroxyalkyl (meth)acrylate (B), and 5 to 20% by weight of the unsaturated compound (C).

8. The curable unsaturated resin composition according to claim 1, wherein the polymerizable unsaturated resin (A) is one kind selected from unsaturated polyester resin, epoxy (meth)acrylate, urethane (meth)acrylate and polyester (meth)acrylate.

9. The curable unsaturated resin composition according to claim 1, wherein the polymerizable unsaturated resin (A) is an air-drying characteristics-imparting unsaturated polyester having an allyl ether group and/or a cyclohexene ring.

* * * * *